(12) United States Patent
Wei et al.

(10) Patent No.: US 11,615,194 B2
(45) Date of Patent: Mar. 28, 2023

(54) VIRTUAL STORAGE SERVICES FOR CLIENT COMPUTING DEVICES

(71) Applicant: Intel Corporation, Santa Clara, CA (US)

(72) Inventors: Changzheng Wei, Shanghai (CN); Ziye Yang, Shanghai (CN); Junyuan Wang, Shanghai (CN); Cunming Liang, Shanghai (CN); Junhua Hou, Shanghai (CN); Weigang Li, Shanghai (CN); Ping Yu, Shanghai (CN); Yi Yang, Beijing (CN); Baoqian Li, Shanghai (CN); Xin Zeng, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 16/975,661

(22) PCT Filed: Jun. 29, 2018

(86) PCT No.: PCT/CN2018/093737
§ 371 (c)(1),
(2) Date: Aug. 25, 2020

(87) PCT Pub. No.: WO2020/000391
PCT Pub. Date: Jan. 2, 2020

(65) Prior Publication Data
US 2020/0410114 A1    Dec. 31, 2020

(51) Int. Cl.
*G06F 21/60* (2013.01)
*G06F 16/14* (2019.01)
(Continued)

(52) U.S. Cl.
CPC .......... *G06F 21/602* (2013.01); *G06F 16/148* (2019.01); *H04L 9/085* (2013.01); *H04L 63/0428* (2013.01); *H04L 67/1097* (2013.01)

(58) Field of Classification Search
None
See application file for complete search history.

(56) References Cited

U.S. PATENT DOCUMENTS

2003/0208681 A1*  11/2003  Muntz ................. G06F 21/6209
                                                           713/179
2004/0123109 A1*   6/2004  Choi .................. H04N 21/8126
                                                           713/176
(Continued)

FOREIGN PATENT DOCUMENTS

CN       102271037 A      12/2011
CN       105989304 A      10/2016
(Continued)

OTHER PUBLICATIONS

International Search Report and Written Opinion dated Feb. 27, 2019 for International Patent Application No. PCT/CN2018/093737, 9 pages.

*Primary Examiner* — Brandon Hoffman
(74) *Attorney, Agent, or Firm* — Schwabe, Williamson & Wyatt, P.C.

(57) ABSTRACT

Embodiments include apparatuses, methods, and systems including one or more servers and one or more storage devices, coupled with each other, to provide virtual storage service to store a file and meta data of the file for a client computing device. The file and the meta data of the file may be encrypted by the client computing device before providing to the virtual storage service. The file may be encrypted with a secret key of the client computing device, and the meta data of the file may be encrypted with a shared session key between the client computing device and the virtual storage service. The encrypted file may be stored in the one or more storage devices, and the encrypted meta data of the (Continued)

file may be stored in one or more secured areas of the one or more servers. Other embodiments may also be described and claimed.

20 Claims, 10 Drawing Sheets

(51) Int. Cl.
*H04L 9/08* (2006.01)
*H04L 9/40* (2022.01)
*H04L 67/1097* (2022.01)

(56) References Cited

U.S. PATENT DOCUMENTS

| | | | | |
|---|---|---|---|---|
| 2007/0242825 | A1* | 10/2007 | Kahn | H04N 21/26606 348/E7.056 |
| 2014/0068791 | A1* | 3/2014 | Resch | G06F 11/2094 726/30 |
| 2015/0169894 | A1* | 6/2015 | Keohane | H04L 67/10 713/165 |
| 2016/0070887 | A1* | 3/2016 | Wu | G06F 21/10 713/189 |
| 2018/0167208 | A1* | 6/2018 | Le Saint | H04L 9/0844 |

FOREIGN PATENT DOCUMENTS

| | | |
|---|---|---|
| CN | 106713334 A | 5/2017 |
| CN | 107054247 A | 8/2018 |
| WO | WO2017112325 A1 | 6/2017 |

* cited by examiner

VIRTUAL STORAGE SERVICES FOR CLIENT COMPUTING DEVICES

CROSS REFERENCE TO RELATED APPLICATIONS

The present application is a national phase entry under 35 U.S.C. § 371 of International Application No. PCT/CN2018/093737, filed Jun. 29, 2018, entitled "Virtual Storage Services for Client Computing Services", which designated, among the various States, the United States of America. The Specifications of the PCT/CN2018/093737 Application is hereby incorporated by reference.

FIELD

Embodiments of the present invention relate generally to the technical fields of computing, and more particularly to virtual storage services for client computing devices by a fog network.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Cloud computing, with the cloud providing various services to client computing devices, has become increasingly popular. Recently, with the emergence of fog networks, some services have been moved from the cloud to the fog networks, so that the services can be provided at the edge, closer to the client computing devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
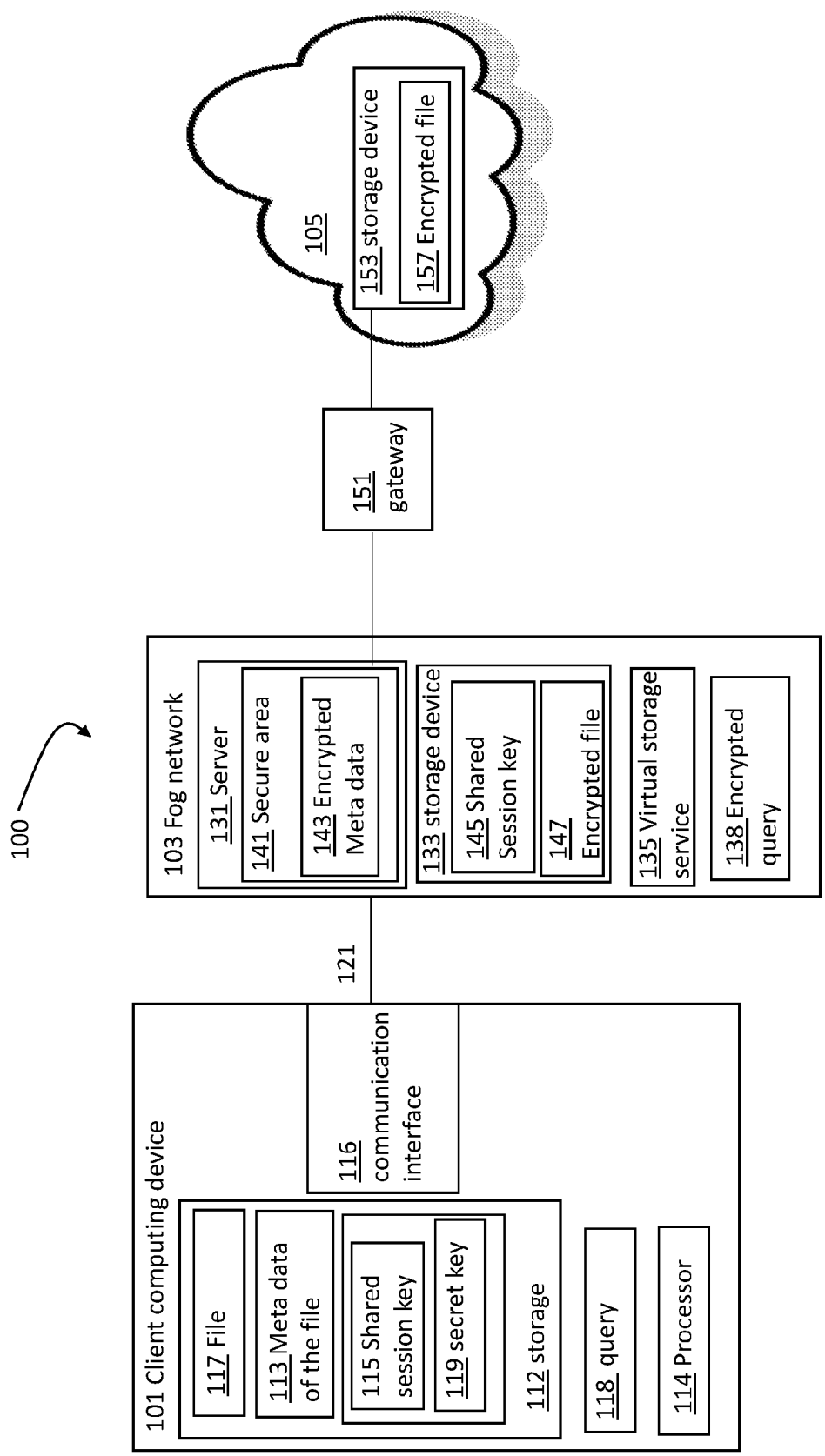
FIG. 1 illustrates an example computing infrastructure including one or more servers coupled to one or more storage devices to provide virtual storage service to a client computing device, in accordance with various embodiments.

It is desirable to provide virtual storage service to store files of computing devices, in particular, by a fog network of computing devices, nearer to the client computing devices. Under today's technology, it is a challenge to provide the virtual storage service with the necessary security and privacy, in particular, providing such virtual storage service by a fog network. One way to increase security may involve encrypting the files to be stored by the virtual storage service. However, it is not possible to search the encrypted files. In order to perform a search, the entire encrypted files may need to be transferred back to the client computing device. Such file transfer may incur additional delay and complexity for the virtual storage service, and at the same time, decrease its usability.

In embodiments, a file and its meta data (associated information of the file) may be encrypted separately by a client computing device using different security keys before providing to the virtual storage service. For example, a file may be encrypted with a secret key of the client computing device, and the meta data of the file may be encrypted with a shared session key between the client computing device and the virtual storage service. The secret key encrypted file may have increased security, while the shared session key encrypted meta data of the file may remain searchable by the virtual storage service, in response to query, in particular, a query encrypted with the same shared session key. Hence, embodiments herein may have the benefits of increased security for the files with increased efficiency for operations performed on the encrypted meta data of the file stored in the virtual storage service.

In embodiments, an apparatus for storing files may include one or more servers and one or more storage devices, coupled with each other, to provide virtual storage service to store a file and meta data of the file for a client computing device. The file and the meta data of the file may be separately encrypted by the client computing device before providing to the virtual storage service. The file may be encrypted with a secret key of the client computing device, and the meta data of the file may be encrypted with a shared session key between the client computing device and the virtual storage service. The encrypted file may be stored in the one or more storage devices, and the encrypted meta data of the file may be stored in one or more secured areas of the one or more servers. In embodiments, the apparatus may be part of a fog network.

In embodiments, a client computing device (consumer of virtual storage service) may include one or more processors and a communication interface coupled with the one or more processors. The one or more processors may encrypt a file based on a secret key of the computing device, and encrypt meta data of the file based on a session key shared between the computing device and virtual storage service. The communication interface may transmit the encrypted file and the encrypted meta data of the file to the virtual storage service to store the encrypted file and the encrypted meta data of the file for the computing device.

In embodiments, one or more non-transitory computer-readable media may include instructions that cause a fog network, in response to execution of the instructions, to provide virtual storage service. One or more servers and one or more storage devices, coupled with each other, may provide the virtual storage service. In response to execution of the instructions, the virtual storage service of the fog network may receive, from a client computing device, an encrypted file being encrypted with a secret key of the client computing device. The fog network may further store the encrypted file in the one or more storage devices. In addition, the virtual storage service of the fog network may receive, from the client computing device, an encrypted meta data of the file being encrypted with a shared session key between the client computing device and the virtual storage service; and store the encrypted meta data of the file in one or more secured areas of the one or more servers.

In embodiments, a method for operating a client computing device may include: generating an encrypted file, wherein the encrypted file may be generated by encrypting a file based on a secret key of the client computing device; generating encrypted meta data of the file, wherein the encrypted meta data of the file may be generated by encrypting the meta data of the file based on a shared session key between the client computing device and virtual storage service. The virtual storage service may be provided by one or more servers and one or more storage devices, coupled with each other. The method may further include: transmitting the encrypted file and the encrypted meta data of the file to the virtual storage service, where the encrypted file may be received by the virtual storage service and stored in the one or more storage devices, and the encrypted meta data of the file may be stored in one or more secured areas of the one or more servers.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "unit," "engine," "module," or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages. By way of example and not limitation, if a first system, apparatus, or device, may be coupled to a second system, apparatus, or device, during operations, the two systems, apparatuses, or devices, are coupled to each other when the two systems, apparatuses, or devices are not in operation. For example, a fog network may be "coupled" to a cloud when its interface is not in operation, if the fog network is coupled to the cloud when its interface is in operation. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

As used herein, the term "interface" or "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

Some embodiments may be used in conjunction with various computing devices and systems, for example, a communication system, a communication device, a wireless device, a wireless communication system, a wireless communication device, a wired communication device, a wired communication system, a personal computer (PC), a desktop computer, a mobile computer, a laptop computer, a notebook computer, an Ultrabook™ computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wired or wireless modem, a video device, an audio device, an audio-video (AN) device, a wired or wireless network, a wireless area network, a wireless video area network (WVAN), a local area network (LAN), a wireless LAN (WLAN), a personal area network (PAN), a wireless PAN (WPAN), a wireless wide area network (WWAN), and the like.

The term "wireless device," as used herein, may include, for example, a device capable of wireless communication, a communication device capable of wireless communication, a communication station capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service.

The term "communication device", as used herein, may include, for example, a device capable of wireless and/or wired communication, a communication device capable of wireless and/or wired communication, a communication station capable of wireless and/or wired communication, a portable or non-portable device capable of wireless and/or wired communication, or the like. In some embodiments, a communication device may be or may include a peripheral that is integrated with a computer, or a peripheral that is attached to a computer.

Some embodiments may be used in conjunction with computing devices and/or networks operating in accordance with existing web real-time communication standards, IEEE 802.11 standards, wireless-gigabit-alliance (\VGA) specifications, wireless fidelity (WiFi) alliance (WFA) peer-to-peer (P2P) specifications, 3rd generation partnership project (3GPP), 3GPP long term evolution (LTE), any current and/or future versions and/or derivatives thereof, and the like.

Some embodiments may be used in conjunction with one way and/or two-way radio communication systems, cellular radio-telephone communication systems, a mobile phone, a cellular telephone, a wireless telephone, a personal communication systems (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation, discrete multi-tone (DMT), Bluetooth®, global positioning system (GPS), Wi-Fi, Wi-Max, ZigBee™, ultra-wideband (UWB), global system for mobile communication (GSM), 2G, 2.5G, 3G, 3.5G, 4G, fifth generation (5G) mobile networks, 3GPP, long term evolution (LTE), LTE advanced, enhanced data rates for GSM evolution (EDGE), or the like. Other embodiments may be used in various other wired and/or wireless devices, systems and/or networks.

FIG. 1 illustrates an example computing infrastructure 100 including one or more servers, e.g., a server 131, coupled to one or more storage devices, e.g., a storage device 133, to provide virtual storage service 135 to store a file and meta data of the file for a client computing device 101, in accordance with various embodiments. For clarity, features of the computing infrastructure 100, the server 131, the storage device 133, the virtual storage service 135, and the client computing device 101, may be described below as an example for understanding an example computing infrastructure, a server, a storage device, virtual storage service, and a client computing device. It is to be understood that there may be more or fewer components included in the computing infrastructure 100, the server 131, the storage device 133, the virtual storage service 135, and the client computing device 101. Further, it is to be understood that one or more of the devices and components within the computing infrastructure 100, the server 131, the storage device 133, the virtual storage service 135, and the client computing device 101 may include additional and/or varying features from the description below, and may include any devices and components that one having ordinary skill in the art would consider and/or refer to as the devices and components of a computing infrastructure, a server, a storage device, virtual storage service, and a client computing device.

In embodiments, the server 131 and the storage device 133 may be part of a fog network 103 coupled to cloud 105, via gateway 151. Client computing device 101 may be coupled to the fog network 103, in particular, the virtual storage service 135 the fog network 103 offers, through a channel 121. The channel 121 may be a secure channel between the client computing device 101 and the virtual storage service 135. The client computing device 101 may be any computing device, which acts as a client to the virtual storage service 135 to store files or meta data of files for the client computing device 101.

In embodiments, the client computing device 101 may include a file 117, meta data of the file 113, a shared session key 115, and a secret key 119, which may be stored in a storage 112. The secret key 119 may be a crypto key known to the client computing device 101 only, not the virtual storage service 135. The shared session key 115 may be shared between the client computing device 101 and the virtual storage service 135. For example, there may be a shared session key 145 stored in the storage device 133 to be used by the virtual storage service 135. In addition, the client computing device 101 may include one or more processors, e.g., a processor 114, and a communication interface 116 coupled with the processor 114.

In embodiments, the file 117 may include an audio file, a multimedia file, a document, an object file, or any other data, document, or file. The file 117 may initially be stored as one entity in the client computing device 101, before transferring to virtual storage service 135 for storage. Additionally and alternatively, the file 117 may initially include multiple entities stored in the client computing device 101, before transferring to virtual storage service 135 for storage. The meta data of the file 113 may include a file name, a file size, a date for the file, an owner of the file, a tag of the file, a portion of the file, or an abstract of the file, e.g., the file 117. The meta data of the file 113 may be a shorter, or simplified version of the file 117, and may contain less sensitive information, personal information than the file 117. In addition, the meta data of the file 113 may contain a summary, an abstract, or some indication of the file 117, so that a search of the meta data of the file 113 via a query may determine whether the file 117 is the file being sought by the query or not.

In embodiments, the processor 114 may encrypt the file 117 based on the secret key 119 of the client computing device 101, and may encrypt the meta data of the file 113 based on the shared session key 115. The file 117 encrypted based on the secret key 119 may have higher level of security than the encrypted meta data, while the meta data of the file 113 encrypted based on the shared session key 115 may have lower level of security than the encrypted file. The shared session key 115 may be a time limited security key to last a certain limited amount of time, or a stable security key lasting a longer time, e.g., more than the time of a session. The shared session key 115 may be established via various security mechanisms known to one having ordinary skill in the art.

In embodiments, the communication interface 116 may transmit the encrypted file and the encrypted meta data of the file to the virtual storage service 135 to store the encrypted file and the encrypted meta data of the file for the client computing device 101. For example, the virtual storage service 135 may store the encrypted file, e.g., an encrypted file 147, in the storage device 133, and may store the encrypted meta data of the file, e.g., an encrypted meta data of the file 143, in one or more secured areas of the one or more servers, e.g., a secure area 141 of the server 131. In some embodiments, the secure area 141 may be a trusted execution environment (TEE), such as an execution environment protected with Intel® software guard extensions (Intel® SGX). More specifically, Intel® SGX is an Intel® technology that enables application developers to provide execution enclaves protect select code and data from disclosure or modification. The secure area 141 (execution enclaves) may be established by virtual storage service 135. The client computing device 101 and the virtual storage service 135 may jointly set up the secure channel 121 to secure their communication. The secure area 141 may protect the privacy and provide security for the encrypted meta data of the file 143, while increasing efficiency of operations for the encrypted meta data of the file 143 and the encrypted file 147.

In embodiments, the processor 114 may further generate a query 118 to inquire about the file 117, after it has provided the file 117 to virtual storage service 135 to store on its behalf. In embodiments, the processor 114 may further encrypt the query 118 based on the shared session key 115 to obtain an encrypted query. The communication interface 116 may transmit the encrypted query to the virtual storage service 135. The virtual storage service 135 may decrypt the encrypted query 138 based on the shared session key 145 to obtain the query, and to search the stored encrypted meta data of the file 143 in response to the query. The communication interface 116 may further receive a corresponding encrypted file from the virtual storage service 135 in response to the query, wherein the corresponding encrypted file may be determined by the virtual storage service 135 as the subject of the encrypted query 138.

In embodiments, as described earlier, the one or more servers 131 and the one or more storage devices 133 arranged to provide virtual storage service to store a file and meta data of the file for a client computing device 101, may be part of the fog network 103, at the edge, near client computing device 101. The file 117 and the meta data of the file 113 may be encrypted by the client computing device 101 before providing to the virtual storage service 135. The file 117 may be encrypted with the secret key 119 of the client computing device 101, and the meta data of the file 113 may be encrypted with the shared session key 115 between the client computing device 101 and the virtual storage service 135. The encrypted file 147 may be stored in the storage device 133 and the encrypted meta data of the file 143 may be stored in one or more secured areas, e.g., the secure area 141, of the server 131. Additionally and alternatively, some of the one or more storage devices, e.g., a storage device 153, may be disposed in the cloud 105 coupled to the fog network 103. The virtual storage service 135 may store the encrypted file from the client computing device 101 as an encrypted file 157 within the storage device 153 of the cloud 105. In other words, the client computing device 101 may send the file 117 being encrypted with the secret key 119, and the virtual storage service 135 may receive the encrypted file 117, store it in the storage device 133 to become the encrypted file 147, or stored it in the storage device 153 to become the encrypted file 157.

In embodiments, the virtual storage service 135 may receive an encrypted query 138 about the file based on the shared session key 145, and the server 131 may decrypt the encrypted query 138 based on the shared session key 145 to obtain a query, and to search the encrypted meta data of the file 143 stored on the server 131 based on the query. In addition, the server 131 may determine the encrypted file 157 is stored in the storage device 153 based on the search performed on the stored encrypted meta data of the file 143, or to retrieve the encrypted file 157 from the cloud 105, thereafter, transmitting the retrieved encrypted file 157 to the client computing device 101.

Figure 2:
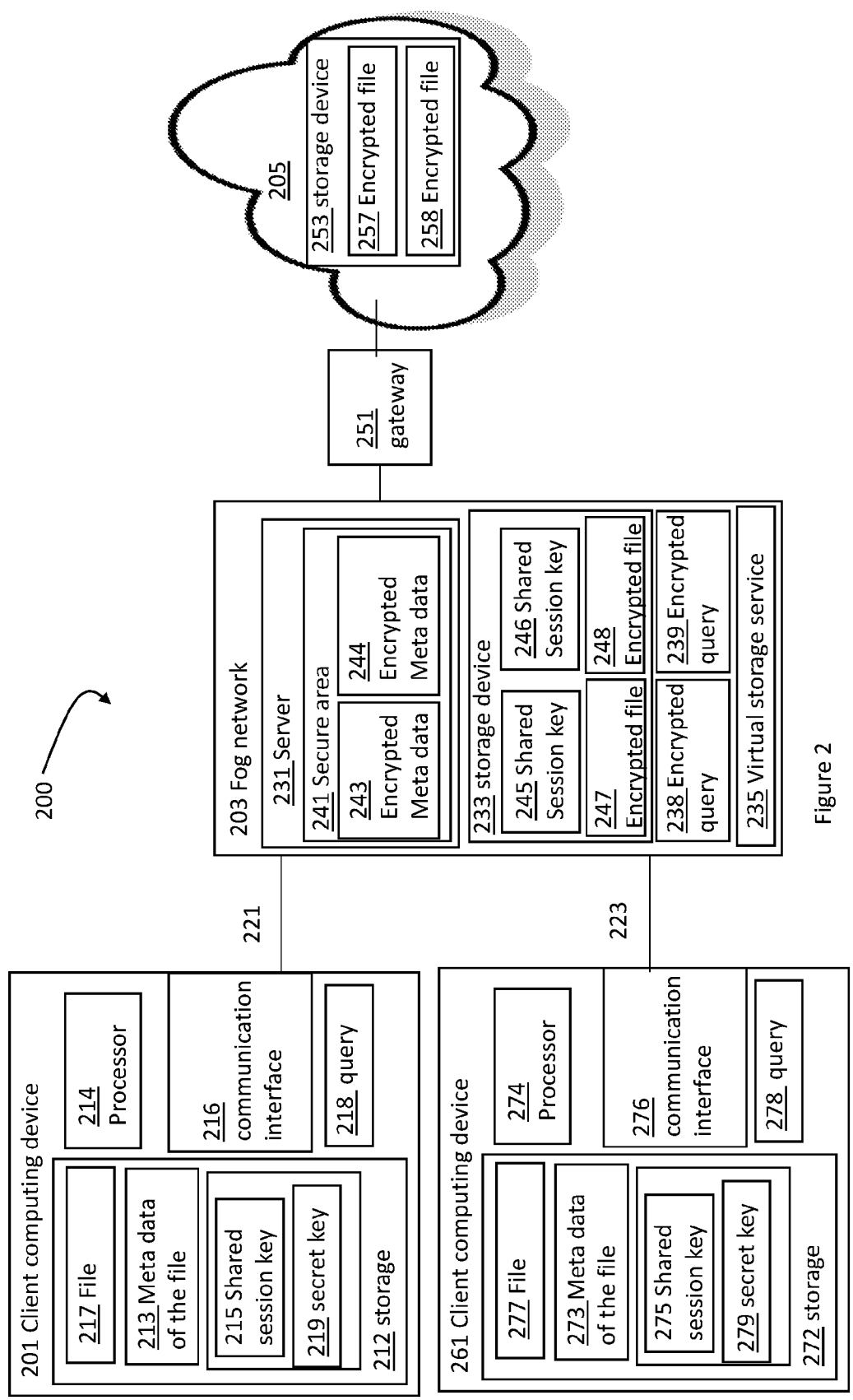
FIG. 2 illustrates another example computing infrastructure including one or more servers coupled to one or more storage devices to provide virtual storage service for multiple client computing devices, in accordance with various embodiments.

FIG. 2 illustrates an example computing infrastructure 200 including one or more servers, e.g., a server 231, coupled to one or more storage devices, e.g., a storage device 233, to provide virtual storage service 235 to store files and meta data of the files for multiple client computing devices, e.g., a client computing device 201 and a client computing device 261, in accordance with various embodiments. The computing infrastructure 200, the server 231, the storage device 233, the virtual storage service 235, and the client computing device 201 or the client computing device 261 may be an extension of example of the computing infrastructure 100, the server 131, the storage device 133, the virtual storage service 135, and the client computing device 101, respectively as shown in FIG. 1.

In embodiments, the computing infrastructure 200 may include the client computing device 201 coupled to a fog network 203 and the virtual storage service 235 through a channel 221, and the client computing device 261 coupled to the fog network 203 and the virtual storage service 235 through a channel 223. The channel 221 may be a secure channel between the client computing device 201 and the virtual storage service 235, while the channel 223 may be a secure channel between the client computing device 261 and the virtual storage service 235. The fog network 203 may be further coupled to a cloud 205 through a gateway 251.

In embodiments, the client computing device 201 may include a file 217, meta data of the file 213, a shared session key 215, and a secret key 219, which may be stored in a storage 212. The shared session key 215 may be shared between the computing device 201 and the virtual storage service 235. For example, there may be a shared session key 245 stored in the storage device 233 to be used by the virtual storage service 235. In addition, the client computing device 201 may include one or more processors, e.g., a processor 214, and a communication interface 216 coupled with the processor 214.

In embodiments, the processor 214 may encrypt the file 217 based on the secret key 219 of the client computing device 201, and may encrypt the meta data of the file 213 based on the shared session key 215. The communication interface 216 may transmit the encrypted file and the encrypted meta data of the file to the virtual storage service 235 to store the encrypted file and the encrypted meta data of the file for the client computing device 201. For example, the virtual storage service 235 may store the encrypted file, e.g., an encrypted file 247, in the storage device 233, and may store the encrypted meta data of the file, e.g., an encrypted meta data of the file 243, in a secure area 241 of the server 231. The processor 214 may further generate a query 218 about the file 217, and may further encrypt the query 218 based on the shared session key 215 to obtain an encrypted query. The communication interface 216 may transmit the encrypted query to the virtual storage service 235 to store it as an encrypted query 238. The virtual storage service 235 may decrypt the encrypted query 238 based on the shared session key 245 to obtain the query, and to search the stored encrypted meta data of the file 243 based on the query. The communication interface 216 may further receive a corresponding encrypted file from the virtual storage service 235, wherein the corresponding encrypted file may be determined by the virtual storage service 235 based on the encrypted query 238.

In embodiments, the client computing device 261 may include a file 277, meta data of the file 273, a shared session key 275, and a secret key 279, which may be stored in a storage 272. The shared session key 275 may be shared between the computing device 261 and the virtual storage service 235 as a shared session key 246 stored in the storage device 233 to be used by the virtual storage service 235. In addition, the client computing device 261 may include a processor 274, and a communication interface 276 coupled with the processor 274.

In embodiments, the processor 274 may encrypt the file 277 based on the secret key 279 of the client computing device 261, and may encrypt the meta data of the file 273 based on the shared session key 275. The communication interface 276 may transmit the encrypted file and the encrypted meta data of the file to the virtual storage service 235 to store the encrypted file and the encrypted meta data of the file for the client computing device 261. For example, the virtual storage service 235 may store the encrypted file, e.g., an encrypted file 248, in the storage device 233, and may store the encrypted meta data of the file, e.g., an encrypted meta data of the file 244 in the secure area 241 of the server 231. The processor 274 may further generate a query 278 about the file 277, and may further encrypt the query 278 based on the shared session key 275 to obtain an encrypted query. The communication interface 276 may transmit the encrypted query to the virtual storage service 235 to store it as an encrypted query 239. The virtual storage service 235 may decrypt the encrypted query 239 based on the shared session key 246 to obtain the query, and to search the stored encrypted meta data of the file 244 based on the query. The communication interface 276 may further receive a corresponding encrypted file from the virtual storage service 235, wherein the corresponding encrypted file may be determined by the virtual storage service 235 based on the encrypted query 239.

In embodiments, the fog network 203 may include the server 231 and the storage device 233, coupled with each other, to provide the virtual storage service 235 to store the file 217 and the meta data of the file 213 for the client computing device 201, and to store the file 277 and the meta data of the file 273 for the client computing device 261.

In embodiments, the file 217 and the meta data of the file 213 may be encrypted by the client computing device 201 before providing to the virtual storage service 235. The file 217 may be encrypted with the secret key 219 of the client computing device 201, and the meta data of the file 213 may be encrypted with the shared session key 215 between the client computing device 201 and the virtual storage service 235. The encrypted file 247 may be stored in the storage device 233 and the encrypted meta data of the file 243 may be stored in the secure area 241 of the server 231. Additionally and alternatively, a storage device 253, may be disposed in the cloud 205 coupled to the fog network 203. The virtual storage service 235 may store the encrypted file from the client computing device 201 as an encrypted file 257 within the storage device 253 of the cloud 205. The virtual storage service 235 may receive the encrypted query 238 about the file based on the shared session key 245, and the server 231 may decrypt the encrypted query 238 based on the shared session key 245 to obtain a query, and to search the encrypted meta data of the file 243 stored on the server 231 based on the query. In addition, the server 231 may determine the encrypted file 247 stored in the storage device 233 based on the search performed on the stored encrypted meta data of the file 243, and to transmit the determined encrypted file 247 to the client computing device 201.

In embodiments, the file 277 and the meta data of the file 273 may be encrypted by the client computing device 261 before providing to the virtual storage service 235. The file 277 may be encrypted with the secret key 279 of the client computing device 261, and the meta data of the file 273 may be encrypted with the shared session key 275 between the client computing device 261 and the virtual storage service 235. The encrypted file 248 may be stored in the storage device 233 and the encrypted meta data of the file 244 may be stored in the secure area 241 of the server 231. Additionally and alternatively, the virtual storage service 235 may store the encrypted file from the client computing device 261 as an encrypted file 258 within the storage device 253 of the cloud 205. The virtual storage service 235 may receive the encrypted query 239 about the file based on the shared session key 246, and the server 231 may decrypt the encrypted query 239 based on the shared session key 246 to obtain a query, and to search the encrypted meta data of the file 244 stored on the server 231 based on the query. In addition, the server 231 may determine the encrypted file 248 stored in the storage device 233 based on the search performed on the stored encrypted meta data of the file 244, and to transmit the determined encrypted file 248 to the client computing device 261.

Figure 3:
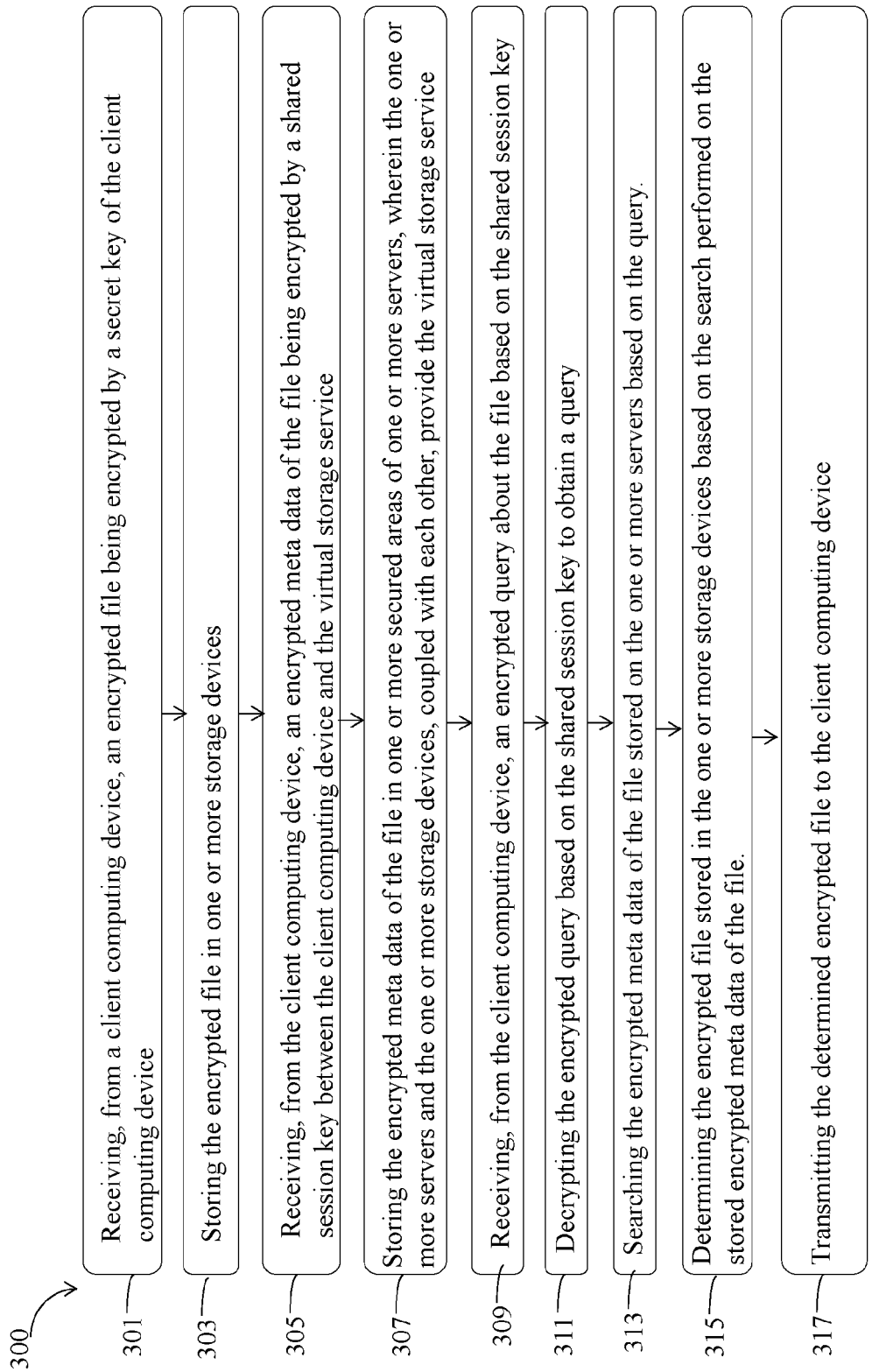
FIG. 3 illustrates an example process for a fog network to provide virtual storage service to a client computing device, in accordance with various embodiments.

FIG. 3 illustrates an example process 300 for a fog network to provide virtual storage service to a client computing device, in accordance with various embodiments. In embodiments, the process 300 may be a process performed by the fog network 103 to provide the virtual storage service 135 in FIG. 1, or the fog network 203 to provide the virtual storage service 235 in FIG. 2.

The process 300 may start at an interaction 301. During the interaction 301, the fog network may provide virtual storage service to receive from a client computing device an encrypted file being encrypted with a secret key of the client computing device. For example, during the interaction 301, the fog network 103 may provide the virtual storage service 135 to receive from the client computing device 101 the encrypted file 147, where the encrypted file 147 may be encrypted with the secret key 119 of the client computing device 101.

During an interaction 303, the virtual storage service may store the encrypted file in one or more storage devices. For example, during the interaction 303, the virtual storage service 135 may store the encrypted file 147 in the storage device 133.

During an interaction 305, the virtual storage service may receive, from the client computing device, an encrypted meta data of the file being encrypted with a shared session key between the client computing device and the virtual storage service. For example, during the interaction 305, the virtual storage service 135 may receive, from the client computing device 101, the encrypted meta data of the file 143 being encrypted with the shared session key 115 between the client computing device 101 and the virtual storage service 135.

During an interaction 307, the virtual storage service may store the encrypted meta data of the file in one or more secured areas of one or more servers, wherein the one or more servers and the one or more storage devices, coupled with each other, provide the virtual storage service. For example, during the interaction 307, the virtual storage service 135 may store the encrypted meta data of the file 143 in the secured area 141 of the server 131. The server 131 and the storage device 133, coupled with each other, provide the virtual storage service 135.

During an interaction 309, the virtual storage service may receive, from the client computing device, an encrypted query about the file based on the shared session key. For example, during the interaction 309, the virtual storage service 135 may receive, from the client computing device 101, the encrypted query 138 about the file 117 based on the shared session key 115.

During an interaction 311, the virtual storage service may decrypt the encrypted query based on the shared session key to obtain a query. For example, during the interaction 311, the virtual storage service 135 may decrypt the encrypted query 138 based on the shared session key 145 to obtain a query.

During an interaction 313, the virtual storage service may search the encrypted meta data of the file stored on the one or more servers based on the query. For example, during the interaction 313, the virtual storage service 135 may search the encrypted meta data of the file 143 stored on the server 131 based on the query.

During an interaction 315, the virtual storage service may determine the encrypted file stored in the one or more storage devices based on the search performed on the stored encrypted meta data of the file. For example, during the interaction 315, the virtual storage service 135 may determine the encrypted file 147 stored in the storage device 133 based on the search performed on the stored encrypted meta data of the file 143.

During an interaction 317, the virtual storage service may transmit the determined encrypted file to the client computing device. For example, during the interaction 317, the virtual storage service 135 may transmit the determined encrypted file 147 to the client computing device 101.

Figure 4:
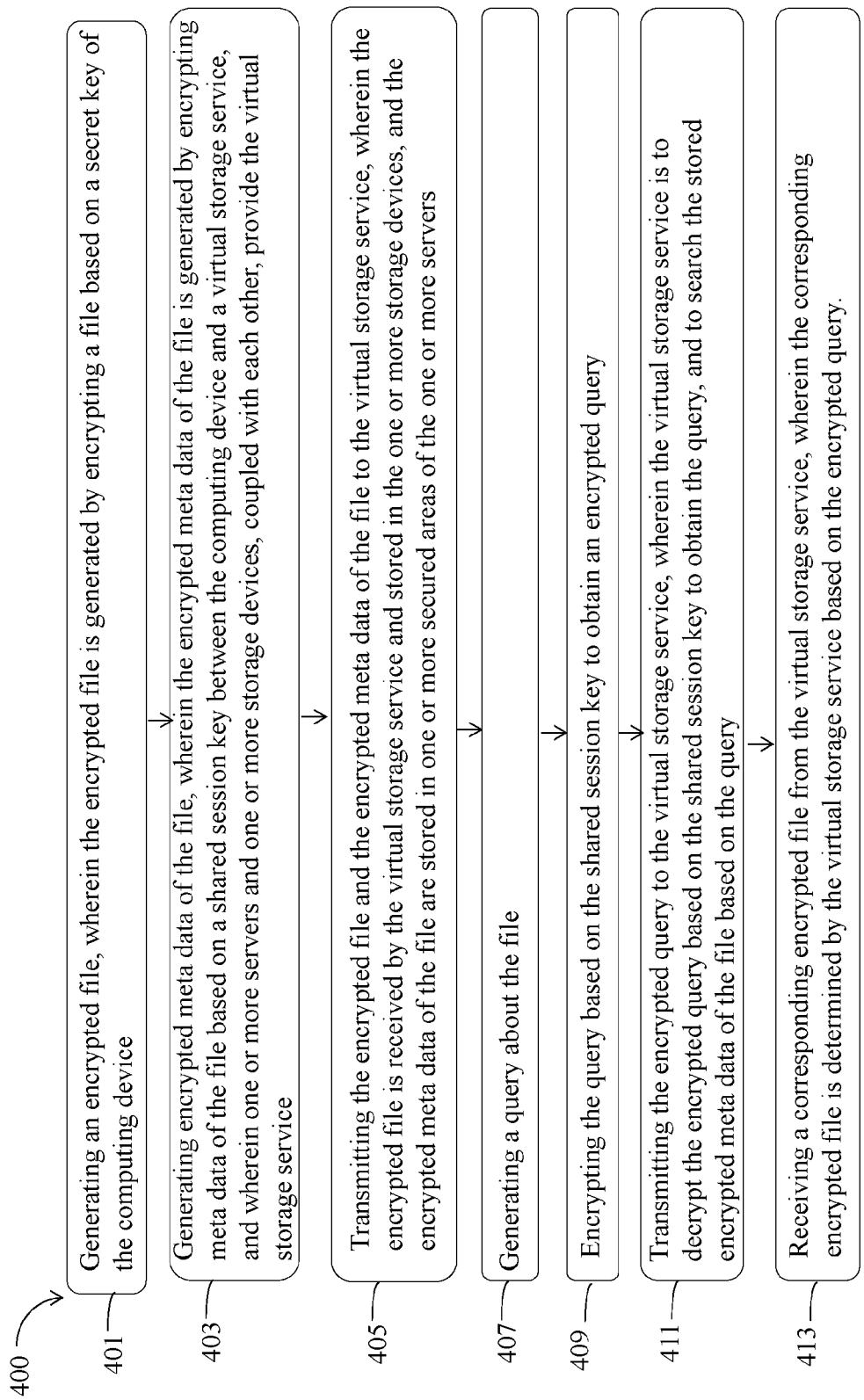
FIG. 4 illustrates an example process for a client computing device to user virtual storage service to store files and meta data of the files, in accordance with various embodiments.

FIG. 4 illustrates an example process 400 for a client computing device to use virtual storage service to store files and meta data of the files, in accordance with various embodiments. In embodiments, the process 400 may be a process performed by the client computing device 101 to use virtual storage service to store files and meta data of the files by the virtual storage service 135 in FIG. 1, or the client computing device 201 to store files and meta data of the files by the virtual storage service 235 in FIG. 2.

The process 400 may start at an interaction 401. During the interaction 401, a client computing device may generate an encrypted file, wherein the encrypted file is generated by encrypting a file based on a secret key of the computing device. For example, during the interaction 401, the client computing device 101 may generate an encrypted file, wherein the encrypted file may be generated by encrypting the file 117 based on the secret key 119.

During an interaction 403, the client computing device may generate encrypted meta data of the file, wherein the encrypted meta data of the file may be generated by encrypting meta data of the file based on a shared session key between the computing device and virtual storage service, and wherein one or more servers and one or more storage devices, coupled with each other, provide the virtual storage service. For example, during the interaction 403, the client computing device 101 may generate encrypted meta data of the file, wherein the encrypted meta data of the file may be generated by encrypting meta data of the file 113 based on the shared session key 115 between the client computing device 101 and the virtual storage service 135.

During an interaction 405, the client computing device may transmit the encrypted file and the encrypted meta data of the file to the virtual storage service, wherein the encrypted file is received by the virtual storage service and stored in the one or more storage devices, and the encrypted meta data of the file are stored in one or more secured areas of the one or more servers. For example, during the interaction 405, the client computing device 101 may transmit the encrypted file and the encrypted meta data of the file to the virtual storage service 135. The encrypted file 147 may be received by the virtual storage service 135 and stored in the storage device 133, and the encrypted meta data of the file 143 may be stored in the secured area 141 of the server 131.

During an interaction 407, the client computing device may generate a query about the file. For example, during the interaction 407, the client computing device 101 may generate the query 118 to inquire about the file 117.

During an interaction 409, the client computing device may encrypt the query based on the shared session key to obtain an encrypted query. For example, during the interaction 409, the client computing device 101 may encrypt the query 118 based on the shared session key 115 to obtain an encrypted query.

During an interaction 411, the client computing device may transmit the encrypted query to the virtual storage service, wherein the virtual storage service is to decrypt the encrypted query based on the shared session key to obtain the query, and to search the stored encrypted meta data of the file based on the query. For example, during the interaction 411, the client computing device 101 may transmit the encrypted query to the virtual storage service 135. The virtual storage service 135 may decrypt the encrypted query 138 based on the shared session key 145 to obtain the query, and to search the stored encrypted meta data of the file 143 based on the query.

During an interaction 413, the client computing device may receive a corresponding encrypted file from the virtual storage service, wherein the corresponding encrypted file is determined by the virtual storage service in response to the encrypted query. For example, during the interaction 413, the client computing device 101 may receive a corresponding encrypted file 147 from the virtual storage service 135, wherein the corresponding encrypted file 147 may be determined by the virtual storage service 135 based on the encrypted query 138.

Figure 5:
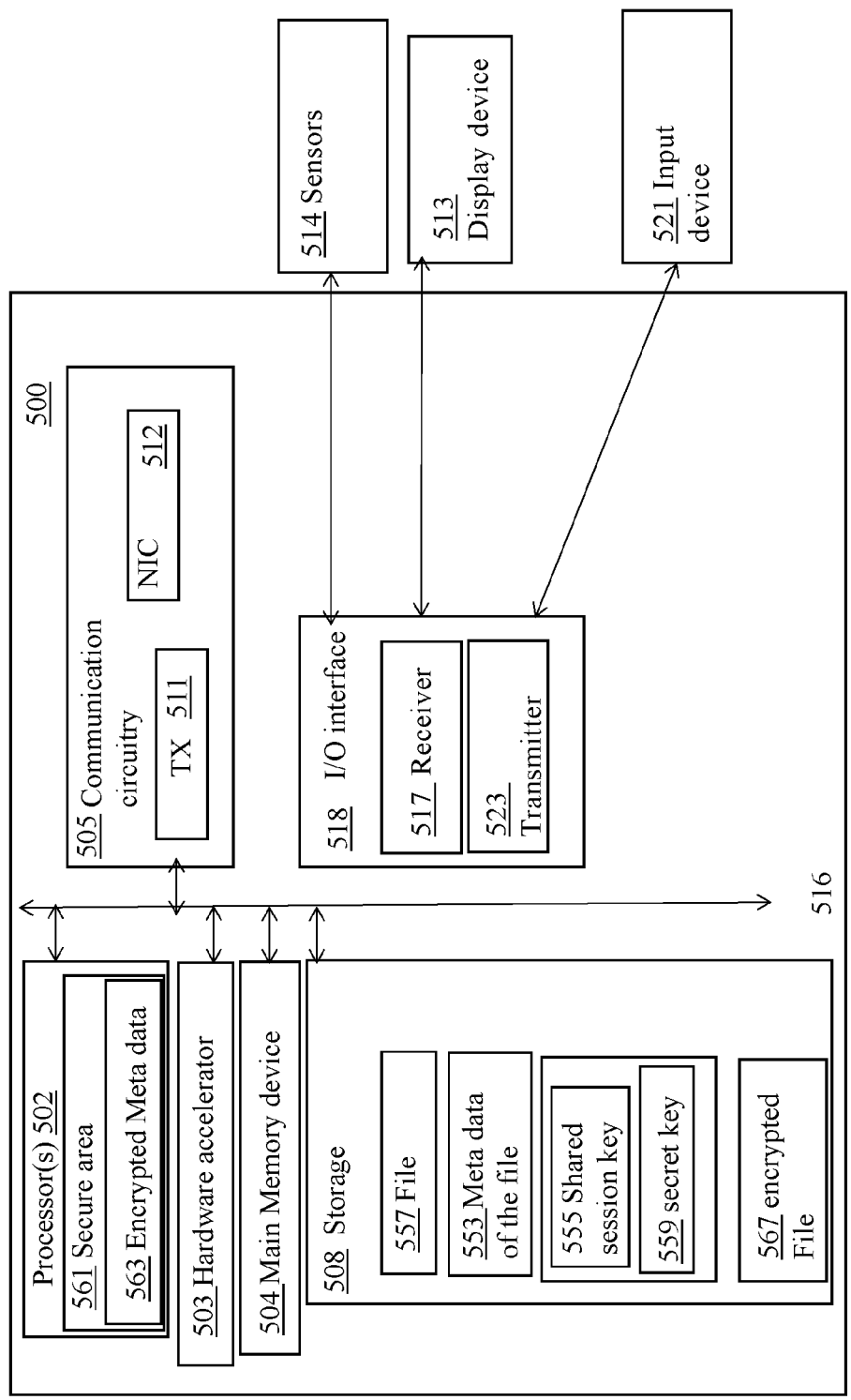
FIG. 5 illustrates an example device suitable for use to practice various aspects of the present disclosure, in accordance with various embodiments.

FIG. 5 illustrates an example device 500 suitable for use to practice various aspects of the present disclosure, in accordance with various embodiments. The device 500 may be used to implement functions of the computing device 101, the computing device 201, the computing device 261, or the process 400. In addition, the device 500 may be used to implement functions of the fog network 103, the fog network 203, or the process 300.

As shown, the device 500 may include one or more processors 502, each having one or more processor cores, or and optionally, a hardware accelerator 503 (which may be an ASIC or a FPGA). In alternate embodiments, the hardware accelerator 503 may be part of processor 502, or integrated together on a SOC. Additionally, the device 500 may include a main memory device 504, which may be any one of a number of known persistent storage medium, and a data storage circuitry 508. In addition, the 500 may include an I/O interface circuitry 518 having a transmitter 523 and a receiver 517, and coupled to one or more sensors 514, a display device 513, and an input device 521. Furthermore, the device 500 may include communication circuitry 505 including a transceiver (Tx) 511, and network interface controller (NIC) 512. The elements may be coupled to each other via system bus 516, which may represent one or more buses. In the case of multiple buses, they may be bridged by one or more bus bridges (not shown).

In embodiments, when the device 500 may implement a computing device, the storage 508 may include a file 557, meta data of the file 553, a shared session key 555, and a secret key 559. In embodiments, the file 557, the meta data of the file 553, the shared session key 555, and the secret key 559 may be similar to the file 117, the meta data of the file 113, the shared session key 115, and the secret key 119, as shown in FIG. 1, the file 217, the meta data of the file 213, the shared session key 215, and the secret key 219, as shown in FIG. 2, the file 277, the meta data of the file 273, the shared session key 275, and the secret key 279, as shown in FIG. 2. The processor(s) 502 may perform functions similarly as the processor 114 as shown in FIG. 1, the processor 214 as shown in FIG. 2, or the processor 274 as shown in FIG. 2.

In embodiments, when the device 500 may implement a fog network, the storage 508 may include an encrypted file 567, and there may be an encrypted meta data of the file 563 stored in a secure area 561 of the processor 502. The encrypted file 567, the encrypted meta data of the file 563, and the secure area 561, may be similar to the encrypted file 147, the encrypted meta data of the file 143, and the secure area 141, as shown in FIG. 1, or similar to the encrypted file 247, the encrypted meta data of the file 243, and the secure area 241, as shown in FIG. 2.

In embodiments, the processor(s) 502 (also referred to as "processor circuitry 502") may be one or more processing elements configured to perform basic arithmetical, logical, and input/output operations by carrying out instructions. Processor circuitry 502 may be implemented as a standalone system/device/package or as part of an existing system/device/package. The processor circuitry 502 may be one or more microprocessors, one or more single-core processors, one or more multi-core processors, one or more multi-threaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 502 may be a part of a SoC in which the processor circuitry 502 and other components discussed herein are formed into a single IC or a single package. As examples, the processor circuitry 502 may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm Snapdragon® processor(s); Samsung Exynos® processor(s); and/or the like.

In embodiments, the I/O interface circuitry 518 may include a sensor hub, which may act as a coprocessor by processing data obtained from the one or more sensors 514. The sensor hub may include circuitry configured to integrate data obtained from each of the one or more sensors 514 by performing arithmetical, logical, and input/output operations. In embodiments, the sensor hub may capable of timestamping obtained sensor data, providing sensor data to the processor circuitry 502 in response to a query for such data, buffering sensor data, continuously streaming sensor data to the processor circuitry 502 including independent streams for each sensor of the one or more sensors 514, reporting sensor data based upon predefined thresholds or conditions/triggers, and/or other like data processing functions.

In embodiments, the memory 504 (also referred to as "memory circuitry 504" or the like) may be circuitry configured to store data or logic for operating the computer device 500. The memory circuitry 504 may include number of memory devices may be used to provide for a given amount of system memory. As examples, the memory circuitry 504 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, anti-fuses, etc.) that may be configured in any suitable implementation as are known. In various implementations, individual memory devices may be formed of any number of different package types, such as single die package (SDP), dual die package (DDP) or quad die package (Q17P), dual inline memory modules (DIMMs) such as microDIMMs or MiniDIMMs, and/or any other like memory devices. To provide for persistent storage of information such as data, applications, operating systems and so forth, the memory circuitry 504 may include one or more mass-storage devices, such as a solid state disk drive (SSDD); flash memory cards, such as SD cards, microSD cards, xD picture cards, and the like, and USB flash drives; on-die memory or registers associated with the processor circuitry 502 (for example, in low power implementations); a micro hard disk drive (HDD); three dimensional cross-point (3D XPOINT) memories from Intel® and Micron®, etc.

Where FPDs are used, the processor circuitry 502 and memory circuitry 504 (and/or data storage circuitry 508) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 502 to implement various logic functions. The memory cells may include any combination of various levels of memory/storage including, but not limited to, EPROM, EEPROM, flash memory, SRAM, anti-fuses, etc.

In embodiments, the data storage circuitry 508 (also referred to as "storage circuitry 508" or the like), with shared or respective controllers, may provide for persistent storage of information, operating systems, etc. The data storage circuitry 508 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 502; hard disk drives (HDDs); micro HDDs; resistance change memories; phase change memories; holographic memories; or chemical memories; among others. As shown, the data storage circuitry 508 is included in the computer device 500; however, in other embodiments, the data storage circuitry 508 may be implemented as one or more devices separated from the other elements of computer device 500.

In some embodiments, the data storage circuitry 508 may include an operating system (OS) (not shown), which may be a general purpose operating system or an operating system specifically written for and tailored to the computer device 500. The OS may include one or more drivers, libraries, and/or application programming interfaces (APIs), which provide program code and/or software components, and/or control system configurations to control and/or obtain/process data from the one or more sensors 514.

The components of computer device 500 may communicate with one another over the bus 516. The bus 516 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), Intel® Accelerator Link (IAL), or some other proprietary bus used in a SoC based interface; or any number of other technologies. In some embodiments, the bus 516 may be a controller area network (CAN) bus system, a Time-Trigger Protocol (TTP) system, or a FlexRay system, which may allow various devices (e.g., the one or more sensors 514, etc.) to communicate with one another using messages or frames.

The communications circuitry 505 may include circuitry for communicating with a wireless network or wired network. For example, the communication circuitry 505 may include transceiver (Tx) 511 and network interface controller (NIC) 512. Communications circuitry 505 may include one or more processors (e.g., baseband processors, modems, etc.) that are dedicated to a particular wireless communication protocol.

NIC 512 may be included to provide a wired communication link to a network and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 512 may be included to allow connect to a second network (not shown) or other devices, for example, a first NIC 512 providing communications to the network 150 over Ethernet, and a second NIC 512 providing communications to other devices over another type of network, such as a personal area network (PAN) including a personal computer (PC) device. In some embodiments, the various components of the device 500, such as the one or more sensors 514, etc. may be connected to the processor(s) 502 via the NIC 512 as discussed above rather than via the I/O interface circuitry 518 as discussed infra.

The Tx 511 may include one or more radios to wirelessly communicate with a network and/or other devices. The Tx 511 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 500. In some embodiments, the various components of the device 500, such as the one or more sensors 514, etc. may be connected to the device 500 via the Tx 511 as discussed above rather than via the I/O interface circuitry 518 as discussed infra. In one example, the one or more sensors 514 may be coupled with device 500 via a short range communication protocol.

The Tx 511 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface circuitry 518 may include circuitry, such as an external expansion bus (e.g., Universal Serial Bus (USB), FireWire, Thunderbolt, PCI/PCIe/PCIx, etc.), used to connect computer device 500 with external components/devices, such as one or more sensors 514, etc. I/O interface circuitry 518 may include any suitable interface controllers and connectors to interconnect one or more of the processor circuitry 502, memory circuitry 504, data storage circuitry 508, communication circuitry 505, and the other components of computer device 500. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 516), ports, slots, jumpers, interconnect modules, receptacles, modular connectors, etc. The I/O interface circuitry 518 may couple the device 500 with the one or more sensors 514, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like.

The one or more sensors 514 may be any device configured to detect events or environmental changes, convert the detected events into electrical signals and/or digital data, and transmit/send the signals/data to the computer device 500. Some of the one or more sensors 514 may be sensors used for providing computer-generated sensory inputs. Some of the one or more sensors 514 may be sensors used for motion and/or object detection. Examples of such one or more sensors 514 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the one or more sensors 514 may include a lens-less image capture mechanism comprising an array of aperture elements, wherein light passing through the array of aperture elements define the pixels of an image. In embodiments, the motion detection one or more sensors 514 may be coupled with or associated with light generating devices, for example, one or more infrared projectors to project a grid of infrared light onto a scene, where an infrared camera may record reflected infrared light to compute depth information.

Some of the one or more sensors 514 may be used for position and/or orientation detection, ambient/environmental condition detection, and the like. Examples of such one or more sensors 514 may include, inter alia, microelectromechanical systems (MEMS) with piezoelectric, piezoresistive and/or capacitive components, which may be used to determine environmental conditions or location information related to the computer device 500. In embodiments, the MEMS may include 3-axis accelerometers, 3-axis gyroscopes, and/or magnetometers. In some embodiments, the one or more sensors 514 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

Each of these elements, e.g., one or more processors 502, the hardware accelerator 503, the memory 504, the data storage circuitry 508, the input/output interface circuitry 518, the one or more sensors 514, the communication circuitry 505 including the Tx 511, and the NIC 512, and the system bus 516 may perform its conventional functions known in the art. In addition, they may be employed to store and host execution of programming instructions (e.g., via storage 508, main memory device 504 and processor(s) 502) implementing the operations associated with an operating system, and one or more applications, e.g., a neural network of an artificial intelligence applications. The operation system and/or applications may be implemented by assembler instructions supported by processor(s) 502 or high-level languages, such as, for example, C, that can be compiled into such instructions. Operations associated with the device 500 not implemented in software may be implemented in hardware, e.g., via hardware accelerator 503.

The number, capability and/or capacity of these elements 502-567 may vary, depending on the number of other devices the device 500 is configured to support. Otherwise, the constitutions of elements 502-567 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 6:
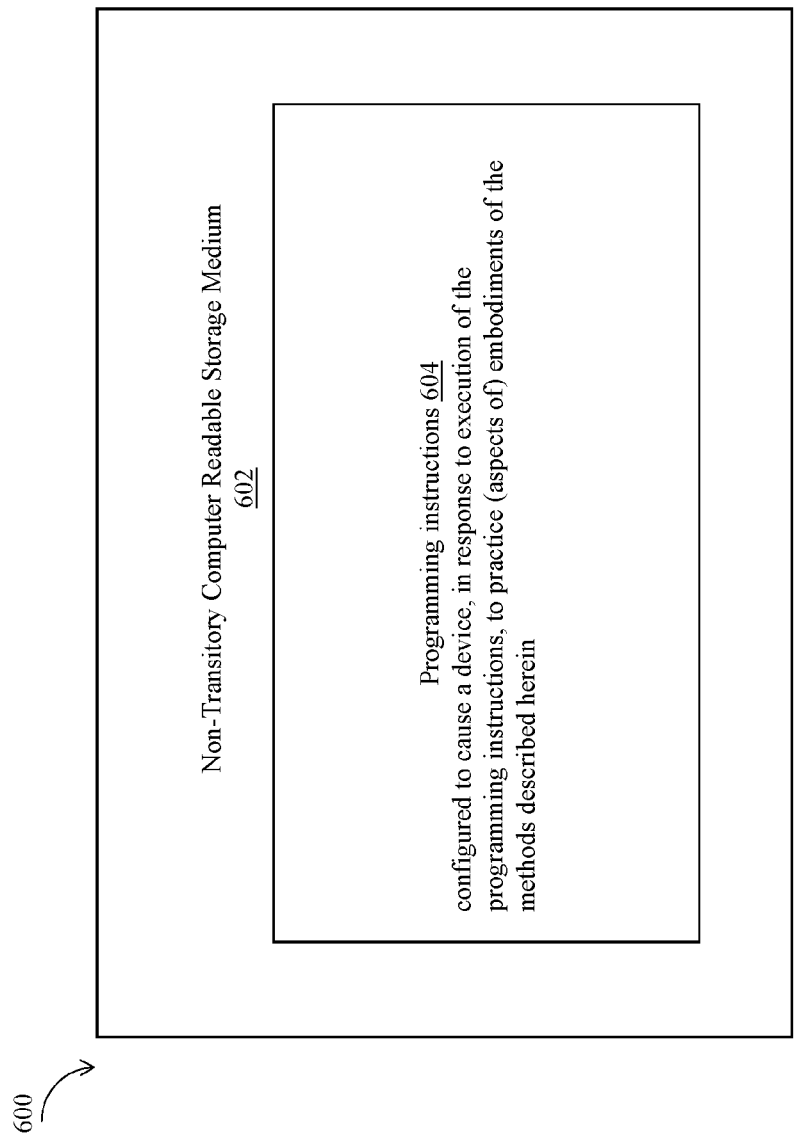
FIG. 6 illustrates a storage medium having instructions for practicing methods described with references to FIGS. 1-5, in accordance with various embodiments.

Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus or a computing device, in response to execution of the instructions by the apparatus or the computing device, to practice selected aspects of the present disclosure. As shown, non-transitory computer-readable storage medium 602 may include a number of programming instructions 604. Programming instructions 604 may be configured to enable a device, e.g., device 500, in particular, processor(s) 502, in response to execution of the programming instructions, to perform, e.g., various operations associated with a computing infrastructure including one or more servers coupled to one or more storage devices to provide virtual storage service to store a file and meta data of the file for a client computing device, as shown in FIGS. 1-5.

In alternate embodiments, programming instructions 604 may be disposed on multiple computer-readable non-transitory storage media 602 instead. In alternate embodiments, programming instructions 604 may be disposed on computer-readable transitory storage media 602, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Figure 7:
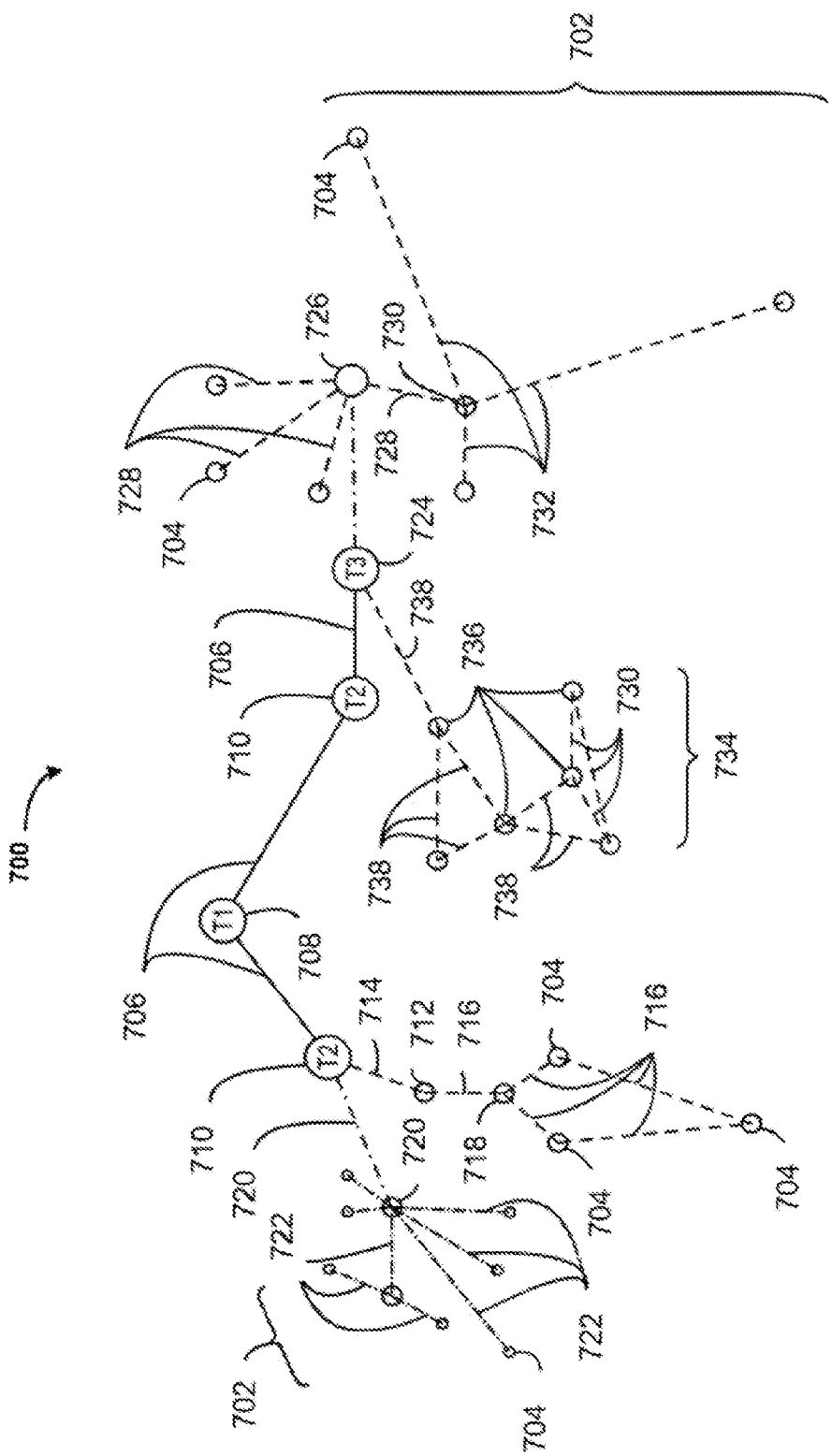
FIG. 7 illustrates an arrangement showing interconnections that may be present between a network and Internet of Things (IoT) networks to provide virtual storage service, in accordance with various embodiments.

FIG. 7 illustrates an arrangement showing interconnections that may be present between a network, e.g., the Internet 700, and Internet of Things (IoT) networks to provide virtual storage service, e.g., the virtual storage service 135 shown in FIG. 1, the virtual storage service 235 shown in FIG. 2, in accordance with various embodiments. The interconnections may couple smaller networks 702, down to the individual IoT device 704, to the fiber backbone 706 of the Internet 700. To simplify the drawing, not every device 704, or other object, is labeled. An individual IoT device 704 may be similar to the client computing device 101 in FIG. 1, or the client computing device 201 in FIG. 2, while networks, e.g., the networks 702, the fiber backbone 706, or the Internet 700 may be similar to the fog network 103 or the cloud 105 in FIG. 1, or the fog network 203 or the cloud 205 in FIG. 2.

The IoT is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 1-7.

In FIG. 7, top-level providers, which may be termed tier 1 providers 708, are coupled by the fiber backbone of the Internet to other providers, such as secondary or tier 2 providers 710. In one example, a tier 2 provider 710 may couple to a tower 712 of an LTE cellular network, for example, by further fiber links, by microwave communications 714, or by other communications technologies. The tower 712 may couple to a mesh network including IoT devices 704 through an LTE communication link 716, for example, through a central node 718. The communications between the individual IoT devices 704 may also be based on LTE communication links 716. In another example, a high-speed uplink 720 may couple a tier 2 provider 710 to a gateway (GW) 720. A number of IoT devices 704 may communicate with the GW 720, and with each other through the GW 720, for example, over Bluetooth® low energy (BLE) links 722, where the BLE is a standard, as defined by the Bluetooth® Special Interest Group.

The fiber backbone 706 may couple lower levels of service providers to the Internet, such as tier 3 providers 724. A tier 3 provider 724 may be considered a general Internet service provider (ISP), for example, purchasing access to the fiber backbone 710 from a tier 2 provider 710 and providing access to a corporate GW 726 and other customers. From the corporate GW 726, a wireless local area network (WLAN) can be used to communicate with IoT devices 704 through Wi-Fi® links 728. A Wi-Fi link 728 may also be used to couple to a low power wide area (LPWA) GW 730, which can communicate with IoT devices 704 over LPWA links 732, for example, compatible with the LoRaWan specification promulgated by the LoRa alliance.

The tier 3 provider 724 may also provide access to a mesh network 734 through a coordinator device 736 that communicates with the tier 3 provider 724 using any number of communications links, such as an LTE cellular link, an LPWA link, or a link 738 based on the IEEE 802.15.4 standard, such as Zigbee®. Other coordinator devices 736 may provide a chain of links that forms cluster tree of linked devices.

IoT devices 704 may be any object, device, sensor, or "thing" that is embedded with hardware and/or software components that enable the object, device, sensor, or "thing" capable of capturing and/or recording data associated with an event, and capable of communicating such data with one or more other devices over a network with little or no user intervention. For instance, in various embodiments, IoT devices 704 may be abiotic devices such as autonomous sensors, gauges, meters, image capture devices, microphones, machine-type communications (MTC) devices, machine-to-machine (M2M) devices, light emitting devices, audio emitting devices, audio and/or video playback devices, electro-mechanical devices (e.g., switch, actuator, etc.), and the like. In some embodiments, IoT devices 704 may be biotic devices such as monitoring implants, biosensors, biochips, and the like. In other embodiments, an IoT device 704 may be a computer device that is embedded in a computer system and coupled with communications circuitry of the computer system. In such embodiments, the IoT device 704 may be a system on chip (SoC), a universal integrated circuitry card (UICC), an embedded UICC (eUICC), and the like, and the computer system may be a mobile station (e.g., a smartphone) or user equipment, laptop PC, wearable device (e.g., a smart watch, fitness tracker, etc.), "smart" appliance (e.g., a television, refrigerator, a security system, etc.), and the like.

Each of the IoT devices 704 may include one or more memory devices and one or more processors to capture and store/record data. Each of the IoT devices 704 may include appropriate communications circuitry (e.g., transceiver(s), modem, antenna elements, etc.) to communicate (e.g., transmit and receive) captured and stored/recorded data. Further, each IoT device 704 may include other transceivers for communications using additional protocols and frequencies. According to various embodiments, the IoT devices 704 may be equipped with information (e.g., referred to as "modem profiles" herein) to configure configurable communications circuitry to perform communications in a corresponding communications. This may allow the IoT devices 704 to communicate using multiple wireless communications protocols without requiring an IoT device 704 to include separate hardware communications modules for each wireless communications protocol. The wireless communications protocols may be any suitable set of standardized rules or instructions implemented by the IoT devices 704 to communicate with other devices, including instructions for packetizing/depacketizing data, instructions for modulating/demodulating signals, instructions for implementation of protocols stacks, and the like. For example, IoT devices 704 may include communications circuitry that is configurable to communicate in accordance with one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like); configurable to communicate using one or more LAN and/or WLAN protocols (e.g., Wi-Fi-based protocols or IEEE 802.11 protocols, such as IEEE 802.16 protocols); one or more cellular communications protocols (e.g., LTE/LTE-A, UMTS, GSM, EDGE, Wi-MAX, etc.); and the like. In embodiments, one or more of tower 712, GW 720, 726, and 730, coordinator device 736, and so forth, may also be incorporated with the embodiments described herein, in particular, with references to FIGS. 1-6.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

Figure 8:
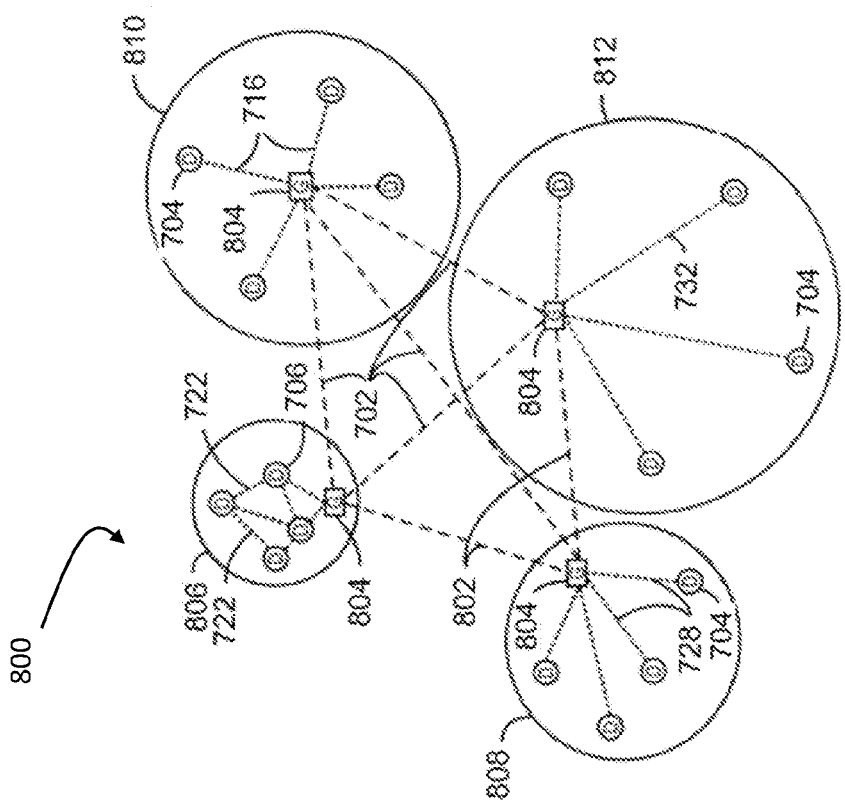
FIG. 8 illustrates an example domain topology for IoT networks to provide virtual storage service, in accordance with various embodiments.

FIG. 8 illustrates an example domain topology 800 for IoT networks coupled through backbone links 802 to GWs 804, to provide virtual storage service, e.g., the virtual storage service 135 shown in FIG. 1, the virtual storage service 235 shown in FIG. 2, in accordance with various embodiments. Like numbered items are as described with respect to FIG. 7. Further, to simplify the drawing, not every device 704, or communications link 716, 722, 728, or 732 is labeled. The backbone links 802 may include any number of wired or wireless technologies, and may be part of a local area network (LAN), a wide area network (WAN), or the Internet. Similar to FIG. 7, in embodiments, one or more of IoT devices 704, GW 804, and so forth, may be incorporated with embodiments described herein. An individual IoT device 704 may be similar to the client computing device 101 in FIG. 1, or the client computing device 201 in FIG. 2, while GW 804 may be similar to the gateway 151 in FIG. 1, or the gateway 251 in FIG. 2.

The network topology 800 may include any number of types of IoT networks, such as a mesh network 806 using BLE links 722. Other IoT networks that may be present include a WLAN network 808, a cellular network 810, and an LPWA network 812. Each of these IoT networks may provide opportunities for new developments, as described herein. For example, communications between IoT devices 704, such as over the backbone links 802, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 806 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 808 may use systems that perform standards conversion to provide multi-standard connectivity, enabling IoT devices 704 using different protocols to communicate. Further systems may provide seamless interconnectivity across a multi-standard infrastructure comprising visible Internet resources and hidden Internet resources.

Communications in the cellular network 810 may be enhanced by systems that offload data, extend communications to more remote devices, or both. The LPWA network 812 may include systems that perform non-Internet protocol (IP) to IP interconnections, addressing, and routing.

Figure 9:
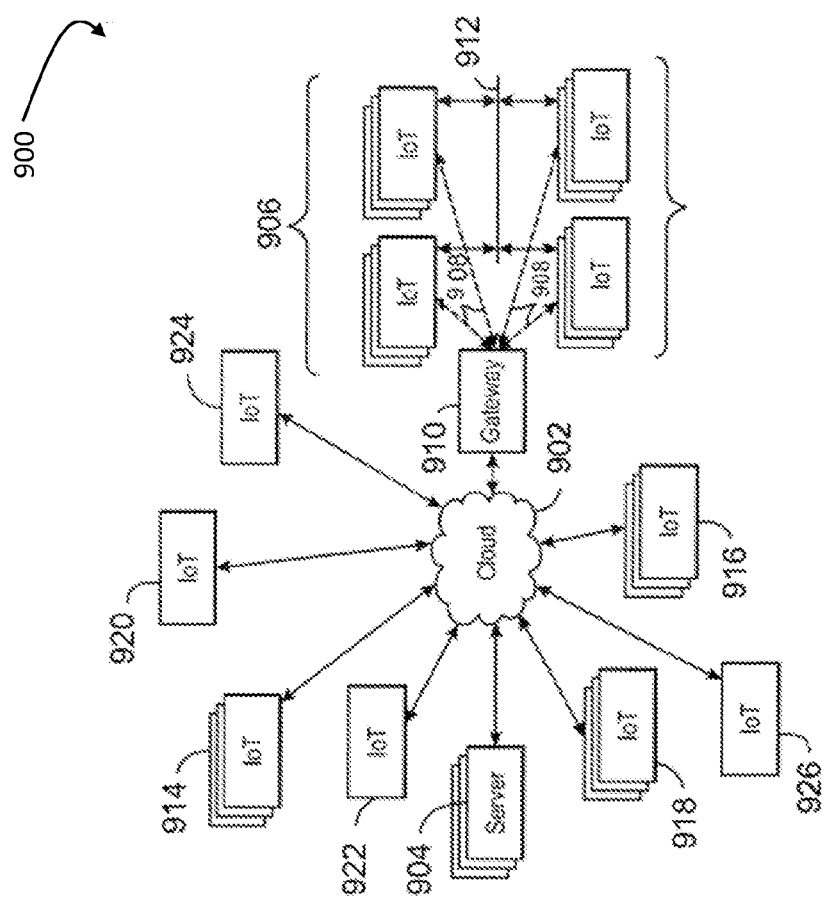
FIG. 9 illustrates an example arrangement of cloud computing network or cloud in communication with a number of IoT devices to provide virtual storage service, in accordance with various embodiments.

FIG. 9 illustrates an example arrangement 900 of cloud computing network or cloud in communication with a number of IoT devices to provide virtual storage service, e.g., the virtual storage service 135 shown in FIG. 1, the virtual storage service 235 shown in FIG. 2, in accordance with various embodiments. The cloud 902 may represent the Internet, one or more cellular networks, a local area network (LAN) or a wide area network (WAN) including proprietary and/or enterprise networks for a company or organization, or combinations thereof. Components used for such communications system can depend at least in part upon the type of network and/or environment selected. Protocols and components for communicating via such networks are well known and will not be discussed herein in detail. However, it should be appreciated that cloud 902 may be associated with network operator who owns or controls equipment and other elements necessary to provide network-related services, such as one or more base stations or access points, and one or more servers for routing digital data or telephone calls (for example, a core network or backbone network).

The IoT devices in FIG. 9 may be the same or similar to the IoT devices 704 discussed with regard to FIGS. 7-8. An individual IoT device 704 may be similar to the client computing device 101 in FIG. 1, or the client computing device 201 in FIG. 2, while the cloud 902 may be similar to the cloud 105 in FIG. 1, or the cloud 205 in FIG. 2.

The IoT devices may include any number of different types of devices, grouped in various combinations, such as IoT group 906 that may include IoT devices that provide one or more services for a particular user, customer, organizations, etc. A service provider may deploy the IoT devices in the IoT group 906 to a particular area (e.g., a geolocation, building, etc.) in order to provide the one or more services. In one example, the IoT group 906 may be a traffic control group where the IoT devices in the IoT group 906 may include stoplights, traffic flow monitors, cameras, weather sensors, and the like, to provide traffic control and traffic analytics services for a particular municipality or other like entity. Similar to FIGS. 7-8, in embodiments, one or more of IoT devices 914-924, GW 910, and so forth, may be incorporated with the various embodiments described herein, in particular, with references to FIGS. 1-7. For example, in some embodiments, the IoT group 906, or any of the IoT groups discussed herein, may include the components, devices, systems discussed with regard to FIGS. 1-7.

The IoT group 906, or other subgroups, may be in communication with the cloud 902 through wireless links 908, such as LPWA links, and the like. Further, a wired or wireless sub-network 912 may allow the IoT devices to communicate with each other, such as through a local area network, a wireless local area network, and the like. The IoT devices may use another device, such as a GW 910 to communicate with the cloud 902. Other groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, or both.

As can be seen from FIG. 9, a large number of IoT devices may be communicating through the cloud 902. This may allow different IoT devices to request or provide information to other devices autonomously. For example, the IoT group 906 may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

In another example, the IoT group 906 may be an industrial control group (also referred to as a "connected factory", an "industry 4.0" group, and the like) where the IoT devices in the IoT group 906 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. In this example, the IoT group 906 may communicate with the servers 904 via GW 910 and cloud 902 to provide captured data, which may be used to provide performance monitoring and analytics to the manufacturer or factory operator. Additionally, the IoT devices in the IoT group 906 may communicate among each other, and/or with other IoT devices of other IoT groups, to make decisions on their own and to perform their tasks as autonomously as possible.

Clusters of IoT devices, such as the IoT groups depicted by FIG. 9, may be equipped to communicate with other IoT devices as well as with the cloud 902. This may allow the IoT devices to form an ad-hoc network between the devices, allowing them to function as a single device, which may be termed a fog device. This is discussed further with respect to FIG. 10.

Figure 10:
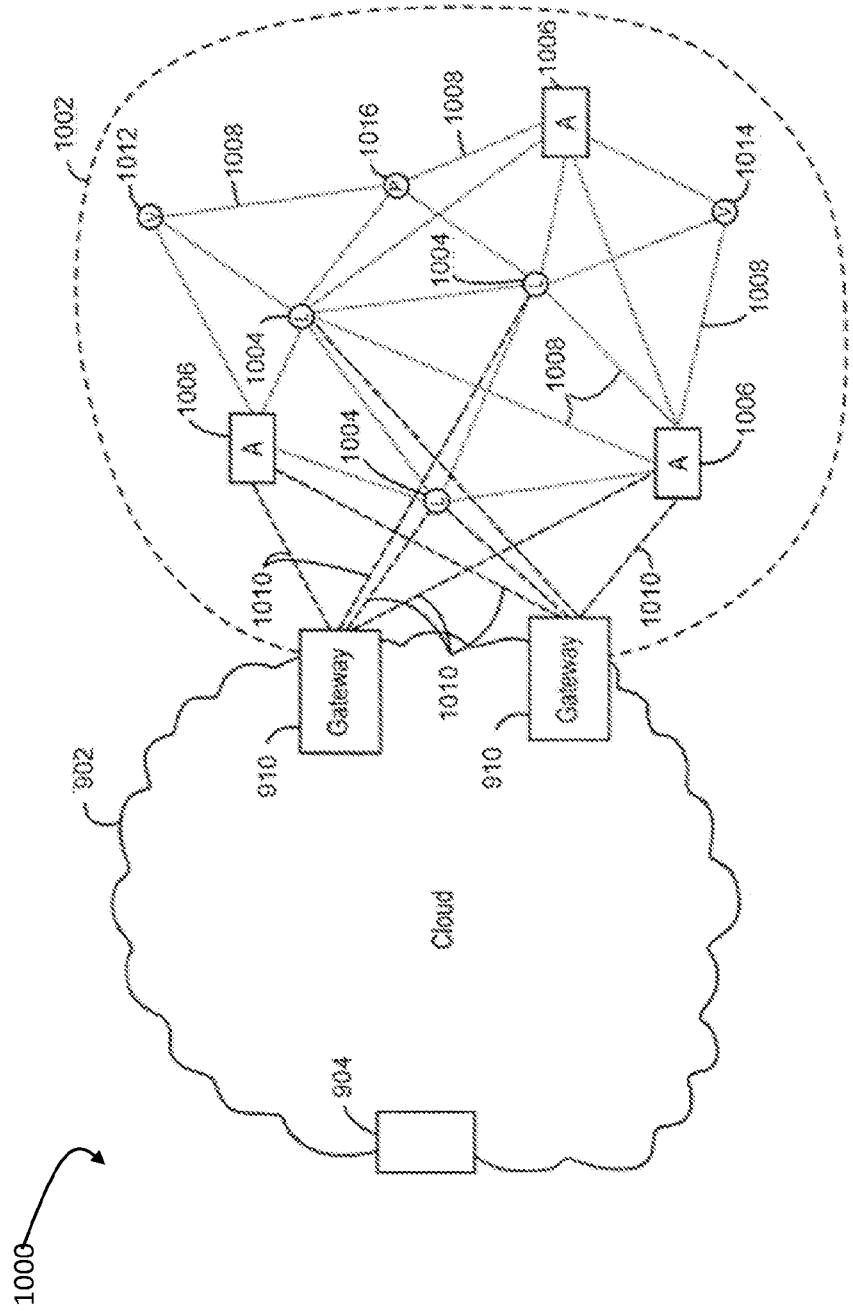
FIG. 10 illustrates an arrangement of a cloud computing network or cloud in communication with a mesh network of IoT devices or IoT fog to provide virtual storage service, in accordance with various embodiments.

FIG. 10 illustrates an arrangement 1000 of a cloud computing network or cloud in communication with a mesh network of IoT devices or IoT fog, which may be termed a fog device 1002, operating at the edge of the cloud 902, to provide virtual storage service, e.g., the virtual storage service 135 shown in FIG. 1, the virtual storage service 235 shown in FIG. 2, in accordance with various embodiments. Like numbered items are as described with respect to FIGS. 7-9. In this example, the fog device 1002 is a group of IoT devices at an intersection. The fog device 1002 may be established in accordance with specifications released by the OpenFog Consortium (OFC), the Open Connectivity Foundation™ (OCF), among others. The fog device 1002 may be similar to the fog network 103 in FIG. 1, or the fog network 203 in FIG. 2.

In embodiments, the fog device 1002 may operate at the edge of the cloud 902, but not limited to the edge of the cloud 902. In some embodiments, the fog device 1002 operating at the edge of the cloud 902 may overlap or subsumed into an edge network for the cloud 902. In some other embodiments, an edge network of the cloud 902 may overlap with the fog device 1002, or become a part of the fog device 1002. Furthermore, the fog device 1002 may be an edge-fog network that includes an edge layer and a fog layer. An edge layer of an edge-fog network may include a collection of loosely coupled, voluntary and human-operated resources such as desktops, laptops, data centers, tablets, etc. The Fog layer resides on top of the edge layer and is a consolidation of networking devices such as routers and switches with high computing capabilities and ability to run cloud application logic on their native architecture.

Data may be captured, stored/recorded, and communicated among the IoT devices 1004. Analysis of the traffic flow and control schemes may be implemented by aggregators 1006 that are in communication with the IoT devices 1004 and each other through a mesh network. Data may be uploaded to the cloud 902, and commands received from the cloud 902, through GWs 910 that are in communication with the IoT devices 1004 and the aggregators 1006 through the mesh network. Similar to FIGS. 7-9, in embodiments, one or more of IoT devices 1004, aggregators 1006, and so forth, may be incorporated with the various embodiments described herein, in particular, with references to FIGS. 1-7. For example, in some embodiments, the fog device 1002, or any of grouping of devices discussed herein, may include the one or more components, devices systems, etc. discussed infra with regard to FIGS. 1-7.

Any number of communications links may be used in the fog device 1002. Shorter-range links 1008, for example, compatible with IEEE 802.15.4 may provide local communications between IoT devices that are proximate to one another or other devices. Longer-range links 1010, for example, compatible with LPWA standards, may provide communications between the IoT devices and the GWs 910. To simplify the diagram, not every communications link 1008 or 1010 is labeled with a reference number.

The fog device 1002 may be considered to be a massively interconnected network wherein a number of IoT devices are in communications with each other, for example, by the communication links 1008 and 1010. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N), among many others.

Communications from any IoT device may be passed along the most convenient path between any of the IoT devices to reach the GWs 910. In these networks, the number of interconnections may provide substantial redundancy, allowing communications to be maintained, even with the loss of a number of IoT devices.

Not all of the IoT devices may be permanent members of the fog device 1002. In the example in the drawing 1000, three transient IoT devices have joined the fog device 1002, a first mobile device 1012, a second mobile device 1014, and a third mobile device 1016. The fog device 1002 may be presented to clients in the cloud 902, such as the server 904, as a single device located at the edge of the cloud 902. In this example, the control communications to specific resources in the fog device 1002 may occur without identifying any specific IoT device 1004 within the fog device 1002. Accordingly, if any IoT device 1004 fails, other IoT devices 1004 may be able to discover and control a resource. For example, the IoT devices 1004 may be wired so as to allow any one of the IoT devices 1004 to control measurements, inputs, outputs, etc., for the other IoT devices 1004. The aggregators 1006 may also provide redundancy in the control of the IoT devices 1004 and other functions of the fog device 1002.

In some examples, the IoT devices may be configured using an imperative programming style, e.g., with each IoT device having a specific function and communication partners. However, the IoT devices forming the fog device 1002 may be configured in a declarative programming style, allowing the IoT devices to reconfigure their operations and communications, such as to determine needed resources in response to conditions, queries, and device failures. This may be performed as transient IoT devices, such as the devices 1012, 1014, 1016, join the fog device 1002. As transient or mobile IoT devices enter or leave the fog 1002, the fog device 1002 may reconfigure itself to include those devices. This may be performed by forming a temporary group of the devices 1012 and 1014 and the third mobile device 1016 to control or otherwise communicate with the IoT devices 1004. If one or both of the devices 1012, 1014 are autonomous, the temporary group may provide instructions to the devices 1012, 1014. As the transient devices 1012, 1014, and 1016, leave the vicinity of the fog device 1002, it may reconfigure itself to eliminate those IoT devices from the network. The fog device 1002 may also divide itself into functional units, such as the IoT devices 1004 and other IoT devices proximate to a particular area or geographic feature, or other IoT devices that perform a particular function. This type of combination may enable the formation of larger IoT constructs using resources from the fog device 1002.

As illustrated by the fog device 1002, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Thus various example embodiments of the present disclosure have been described including, but are not limited to:

Example 1 may include an apparatus for storing files, comprising: one or more servers and one or more storage devices, coupled with each other, to provide virtual storage service to store a file and meta data of the file for a client computing device; wherein the file and the meta data of the file are encrypted by the client computing device before providing to the virtual storage service, the file being encrypted with a secret key of the client computing device, and the meta data of the file being encrypted with a shared session key between the client computing device and the virtual storage service; and wherein the encrypted file is stored in the one or more storage devices, and the encrypted meta data of the file are stored in one or more secured areas of the one or more servers.

Example 2 may include the apparatus of example 1 and/or some other examples herein, wherein the meta data of the file include a file name, a file size, a date for the file, an owner of the file, a tag of the file, a portion of the file, or an abstract of the file.

Example 3 may include the apparatus of example 1 and/or some other examples herein, wherein the file includes an audio file, a multimedia file, a document, or an object file.

Example 4 may include the apparatus of example 1 and/or some other examples herein, wherein the one or more servers and the one or more storage devices are part of a fog network of computing devices.

Example 5 may include the apparatus of example 1 and/or some other examples herein, wherein the one or more servers are part of a fog network, and the one or more storage devices are disposed in a cloud coupled to the fog network.

Example 6 may include the apparatus of example 1 and/or some other examples herein, wherein the encrypted file and the encrypted meta data of the file are provided to the virtual storage service through a secure channel between the client computing device and the virtual storage service.

Example 7 may include the apparatus of example 1 and/or some other examples herein, wherein the virtual storage service is to receive an encrypted query about the file based on the shared session key, and the one or more servers is to decrypt the encrypted query based on the shared session key to obtain a query, and to search the encrypted meta data of the file stored on the one or more servers based on the query.

Example 8 may include the apparatus of example 7 and/or some other examples herein, wherein the one or more servers is to determine the encrypted file stored in the one or more storage devices based on the search performed on the stored encrypted meta data of the file, and to transmit the determined encrypted file to the client computing device.

Example 9 may include the apparatus of example 1 and/or some other examples herein, wherein the client computing device, the file, the encrypted file, the encrypted meta data of the file, the secret key, or the shared session key is a first client computing device, a first file, a first encrypted file, a first encrypted meta data of the first file, a first secret key, or a first shared session key, and the one or more servers and one or more storage devices are to provide virtual storage service to store a second file and second meta data of the second file for a second client computing device; wherein the second file and the second meta data of the second file are encrypted by the second client computing device before providing to the virtual storage service, the second file being encrypted with a second secret key of the second client computing device, and the second meta data of the second file being encrypted with a second shared session key between the second client computing device and the virtual storage service; and wherein the second encrypted file is stored in the one or more storage devices, and the second encrypted meta data of the second file are stored in the one or more secured areas of the one or more servers.

Example 10 may include a computing device, comprising: one or more processors to: encrypt a file based on a secret key of the computing device; and encrypt meta data of the file based on a session key shared between the computing device and virtual storage service; and a communication interface coupled with the one or more processors to transmit the encrypted file and the encrypted meta data of the file to the virtual storage service to store the encrypted file and the encrypted meta data of the file for the computing device.

Example 11 may include the computing device of example 10 and/or some other examples herein, wherein the communication interface is to transmit the encrypted file and the encrypted meta data of the file to the virtual storage service through a secure channel between the computing device and the virtual storage service.

Example 12 may include the computing device of example 10 and/or some other examples herein, wherein the one or more processors is to generate an encrypted query about the file based on the shared session key, and the communication interface is to transmit the encrypted query to the virtual storage service, wherein the virtual storage service is to decrypt the encrypted query based on the shared session key, and to search and locate the stored encrypted meta data of the file to generate a response to the encrypted query.

Example 13 may include the computing device of example 12 and/or some other examples herein, wherein the communication interface is to receive the encrypted file from the virtual storage service as the response to the encrypted query.

Example 14 may include one or more non-transitory computer-readable media comprising instructions that cause a fog network to provide virtual storage service, in response to execution of the instructions by the virtual storage service, to: receive, from a client computing device, an encrypted file being encrypted with a secret key of the client computing device; store the encrypted file in one or more storage devices; receive, from the client computing device, an encrypted meta data of the file being encrypted with a shared session key between the client computing device and the virtual storage service; and store the encrypted meta data of the file in one or more secured areas of one or more servers, wherein the one or more servers and the one or more storage devices, coupled with each other, provide the virtual storage service.

Example 15 may include the one or more non-transitory computer-readable media of example 14 and/or some other examples herein, wherein in response to execution of the instructions by the virtual storage service, further to: receive, from the client computing device, an encrypted query about the file based on the shared session key; decrypt the encrypted query based on the shared session key to obtain a query; search the encrypted meta data of the file stored on the one or more servers based on the query.

Example 16 may include the one or more non-transitory computer-readable media of example 15 and/or some other examples herein, wherein in response to execution of the instructions by the virtual storage service, further to: determine the encrypted file stored in the one or more storage devices based on the search performed on the stored encrypted meta data of the file, and transmit the determined encrypted file to the client computing device.

Example 17 may include the one or more non-transitory computer-readable media of example 14 and/or some other examples herein, wherein the one or more servers and the one or more storage devices are part of the fog network.

Example 18 may include the one or more non-transitory computer-readable media of example 14 and/or some other examples herein, wherein the one or more servers are part of the fog network, and the one or more storage devices are disposed in a cloud coupled to the fog network.

Example 19 may include the one or more non-transitory computer-readable media of example 14 and/or some other examples herein, wherein the encrypted file and the encrypted meta data of the file are provided to the virtual storage service through a secure channel between the client computing device and the virtual storage service.

Example 20 may include a method for a computing device, comprising: generating an encrypted file, wherein the encrypted file is generated by encrypting a file based on a secret key of the computing device; generating encrypted meta data of the file, wherein the encrypted meta data of the file is generated by encrypting the meta data of the file based on a shared session key between the computing device and virtual storage service, and wherein one or more servers and one or more storage devices, coupled with each other, provide the virtual storage service; and transmitting the encrypted file and the encrypted meta data of the file to the virtual storage service, wherein the encrypted file is received by the virtual storage service and stored in the one or more storage devices, and the encrypted meta data of the file are stored in one or more secured areas of the one or more servers.

Example 21 may include the method of example 20 and/or some other examples herein, further comprising: generating a query about the file; encrypting the query based on the shared session key to obtain an encrypted query; and transmitting the encrypted query to the virtual storage service, wherein the virtual storage service is to decrypt the encrypted query based on the shared session key to obtain the query, and to search the stored encrypted meta data of the file based on the query.

Example 22 may include the method of example 21 and/or some other examples herein, further comprising: receiving a corresponding encrypted file from the virtual storage service, wherein the corresponding encrypted file is determined by the virtual storage service based on the encrypted query.

Example 23 may include the method of example 20 and/or some other examples herein, wherein the one or more servers and the one or more storage devices are part of the fog network.

Example 24 may include the method of example 20 and/or some other examples herein, wherein the one or more servers are part of the fog network, and the one or more storage devices are disposed in a cloud coupled to the fog network.

Example 25 may include the method of example 20 and/or some other examples herein, wherein the encrypted file and the encrypted meta data of the file are transmitted through a secure channel between the computing device and the virtual storage service.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. A system to provide a virtual storage service for a client computing device for storing a file and associated metadata, wherein the system comprises:
   one or more storage devices to store an encrypted file, wherein the encrypted file is produced by encryption of the file by the client computing device using a secret; and
   one or more servers connected to the one or more storage devices, wherein the one or more servers are to:
      receive, from the client computing device, the encrypted file and encrypted metadata, wherein the encrypted metadata is produced by encryption of the metadata by the client computing device using a shared session key, and the shared session key is shared between the client computing device and the virtual storage service; and
      store the encrypted metadata in one or more secured areas of the one or more servers, wherein the stored encrypted metadata is for retrieval of the stored encrypted file;
   wherein the virtual storage service is to receive an encrypted query about the file based on the shared session key, and the one or more servers is to decrypt the encrypted query based on the shared session key to obtain a query, and to search the encrypted metadata of the file stored on the one or more servers based on the query.

2. The system of claim 1, wherein the metadata includes a file name, a file size, a date for the file, an owner of the file, a tag of the file, a portion of the file, or an abstract of the file.

3. The system of claim 1, wherein the file includes an audio file, a multimedia file, a document, or an object file.

4. The system of claim 1, wherein the one or more servers and the one or more storage devices are part of a fog network of computing devices.

5. The system of claim 1, wherein the one or more servers are part of a fog network, and the one or more storage devices are disposed in a cloud coupled to the fog network.

6. The system of claim 1, wherein the encrypted file and the encrypted metadata of the file are provided to the virtual storage service through a secure channel between the client computing device and the virtual storage service.

7. The system of claim 1, wherein the one or more servers is to determine the encrypted file stored in the one or more storage devices based on the search performed on the stored encrypted metadata of the file, and to transmit the determined encrypted file to the client computing device.

8. The system of claim 1, wherein the client computing device, the file, the encrypted file, the encrypted metadata of the file, the secret key, or the shared session key is a first client computing device, a first file, a first encrypted file, a first encrypted metadata of the first file, a first secret key, or a first shared session key, and the one or more servers and one or more storage devices are to provide virtual storage service to store a second file and second metadata of the second file for a second client computing device.

9. A computing device, comprising:
   one or more processors to:
      encrypt a file based on a secret key of the computing device to generate an encrypted file; and
      encrypt metadata of the file based on a key shared between the computing device and a virtual storage service to generate an encrypted metadata; and
   a communication interface coupled with the one or more processors to transmit the encrypted file and the encrypted metadata of the file to the virtual storage service, wherein the virtual storage service is to store the encrypted file in one or more storage device, and wherein the virtual storage service is to store the encrypted metadata in one or more secured areas of one or more servers, wherein the stored encrypted metadata is for retrieval of the stored encrypted file;
   wherein the one or more processors are to generate an encrypted query about the file based on the shared key, and the communication interface is to transmit the encrypted query to the virtual storage service, wherein the virtual storage service is to decrypt the encrypted query based on the shared key, and to search and locate the stored encrypted metadata of the file to generate a response to the encrypted query.

10. The computing device of claim 9, wherein the communication interface is to transmit the encrypted file and the encrypted metadata of the file to the virtual storage service through a secure channel between the computing device and the virtual storage service.

11. The computing device of claim 9, wherein the communication interface is to receive the encrypted file from the virtual storage service as the response to the encrypted query.

12. One or more non-transitory computer-readable media (NTCRM) comprising instructions that cause a virtual storage service for a client computing device for storing a file and associated metadata, in response to execution of the instructions by the virtual storage service, to:
    identify, from the client computing device, a received encrypted file that was produced by encryption of a file by the client computing device using a secret key;
    store the encrypted file in one or more storage devices;
    identify, from the client computing device, a received encrypted metadata, where the encrypted metadata is generated by the client computing device using a shared key to encrypt metadata of the file, wherein the shared key is shared between the client computing device and the virtual storage service;
        store the encrypted metadata in one or more secured areas of one or more servers, wherein the stored encrypted metadata is for retrieval of the stored encrypted file;
    identify, from the client computing device, a received encrypted query about the file based on the shared key;
    decrypt the encrypted query based on the shared key to obtain a query; and
    search the encrypted metadata of the file stored on the one or more servers based on the query.

13. The one or more NTCRM of claim 12, wherein the instructions are further to cause the virtual storage service to:
    identify the encrypted file stored in the one or more storage devices based on the search performed on the stored encrypted metadata of the file; and
    transmit the identified encrypted file to the client computing device.

14. The one or more NTCRM of claim 12, wherein the one or more servers are part of a fog network, and the one or more storage devices are disposed in a cloud coupled to the fog network.

15. The one or more NTCRM of claim 12, wherein the encrypted file and the encrypted metadata of the file are provided to the virtual storage service through a secure channel between the client computing device and the virtual storage service.

16. A method for a virtual storage service for a client computing device to store a file and associated metadata, the method comprising:
    generating an encrypted file, wherein the encrypted file is generated by encrypting the file using a secret key of the computing device;
    generating encrypted metadata, wherein the encrypted metadata is generated by encrypting the metadata using a shared session key between the computing device and the virtual storage service;
    transmitting the encrypted file and the encrypted metadata of the file to the virtual storage service, wherein the encrypted file is received by the virtual storage service and stored in one or more storage devices of the virtual storage service, and the encrypted metadata of the file are stored in one or more secured areas of one or more servers of the virtual storage service, wherein the stored encrypted metadata is for retrieval of the stored encrypted file;
    generating a query about the file;
    encrypting the query based on the shared session key to obtain an encrypted query; and
    transmitting the encrypted query to the virtual storage service, wherein the virtual storage service is to decrypt the encrypted query based on the shared session key to obtain the query, and to search the stored encrypted metadata of the file based on the query.

17. The method of claim 16, further comprising:
    retrieving the encrypted file received from the virtual storage service, wherein the encrypted version of the file is retrieved by the virtual storage service in response to the encrypted query.

18. The method of claim 16, wherein one or both of the one or more servers and the one or more storage devices are part of a fog network.

19. The method of claim 16, wherein the one or more servers are part of a fog network, and the one or more storage devices are disposed in a cloud coupled to the fog network.

20. The method of claim 16, wherein the encrypted file and the encrypted metadata of the file are transmitted through a secure channel between the computing device and the virtual storage service.

* * * * *

UNITED STATES PATENT AND TRADEMARK OFFICE
CERTIFICATE OF CORRECTION

PATENT NO. : 11,615,194 B2
APPLICATION NO. : 16/975661
DATED : March 28, 2023
INVENTOR(S) : Changzheng Wei et al.

It is certified that error appears in the above-identified patent and that said Letters Patent is hereby corrected as shown below:

In the Claims

Column 31
Line 61, "...using a secret;" should read "...using a secret key;"

Signed and Sealed this
Fourth Day of July, 2023

Katherine Kelly Vidal
*Director of the United States Patent and Trademark Office*